(12) United States Patent
Sawdon

(10) Patent No.: US 6,779,343 B2
(45) Date of Patent: Aug. 24, 2004

(54) AIR TO OIL INTENSIFIER

(75) Inventor: Edwin G. Sawdon, St. Clair, MI (US)

(73) Assignee: BTM Corporation, Marysville, MI (US)

( * ) Notice: Subject to any disclaimer, the term of this patent is extended or adjusted under 35 U.S.C. 154(b) by 34 days.

(21) Appl. No.: 10/243,865

(22) Filed: Sep. 13, 2002

(65) Prior Publication Data

US 2004/0006984 A1 Jan. 15, 2004

Related U.S. Application Data

(63) Continuation-in-part of application No. 10/192,144, filed on Jul. 10, 2002.

(51) Int. Cl.[7] .............................................. B60T 13/58
(52) U.S. Cl. .............................. 60/563; 60/560; 92/151
(58) Field of Search .......................... 60/560, 563, 565, 60/593, 576, 579, 591; 92/151

(56) References Cited

U.S. PATENT DOCUMENTS

| | | | |
|---|---|---|---|
| 3,426,530 A | * | 2/1969 | Georgelin ..................... 60/560 |
| 3,633,365 A | * | 1/1972 | Belknap ........................ 60/560 |
| 4,271,671 A | | 6/1981 | Smeets |
| 4,300,351 A | | 11/1981 | Grullmeier |
| 4,395,027 A | * | 7/1983 | Nordmeyer ................... 60/593 |
| 4,499,728 A | * | 2/1985 | Therond ........................ 60/591 |
| 4,993,226 A | | 2/1991 | De Kok |
| 5,107,681 A | | 4/1992 | Wolfbauer, III |
| 5,218,821 A | | 6/1993 | Beneteau |
| 5,247,871 A | | 9/1993 | Brasca et al. |
| 5,265,423 A | | 11/1993 | Glaser |
| 5,429,036 A | | 7/1995 | Latos |
| 5,526,644 A | | 6/1996 | Brieschke |
| 5,582,009 A | * | 12/1996 | Brieschke ..................... 60/560 |
| 5,649,424 A | * | 7/1997 | Valavaara ..................... 60/560 |
| 5,865,029 A | * | 2/1999 | Brieschke ..................... 60/560 |

OTHER PUBLICATIONS

Tox Pressotechnik LLC product brochure, 12 pages, date unknown.
Multicyl product brochure, 8 pages, dated 07/99.
Aries Engineering Company Inc. product brochure, 5 pages, date unknown.
U.S. patent application Ser. No. 10/192,144, Sawdon, filed Jul. 10, 2002.
Farger & Joosten product brochure, 4 pages, dated 09/99.
Farger & Joosten product brochure, 2 pages, dated 03/99.
Alfamatic product information from website, 2 pages.
G.P.A. Italiana S.p.A. product information from website, 2 pages.
Attexor Inc. product brochure, 2 pages, dated unknown.
OHMA Systems Inc. product brochure, 44 pages, dated 1995.

* cited by examiner

Primary Examiner—Edward K. Look
Assistant Examiner—Michael Leslie
(74) Attorney, Agent, or Firm—Harness, Dickey & Pierce, P.L.C.

(57) ABSTRACT

A pressure intensifier for generating a relatively large output force includes a piston driven in an advancing direction and a retracting direction. In one embodiment, two pistons are also driven to eliminate the need for a high pressure source. Another embodiment includes a biased piston for urging a ram in the advancing direction. A module for converting a single piston intensifier to a dual piston intensifier is also discussed.

22 Claims, 13 Drawing Sheets

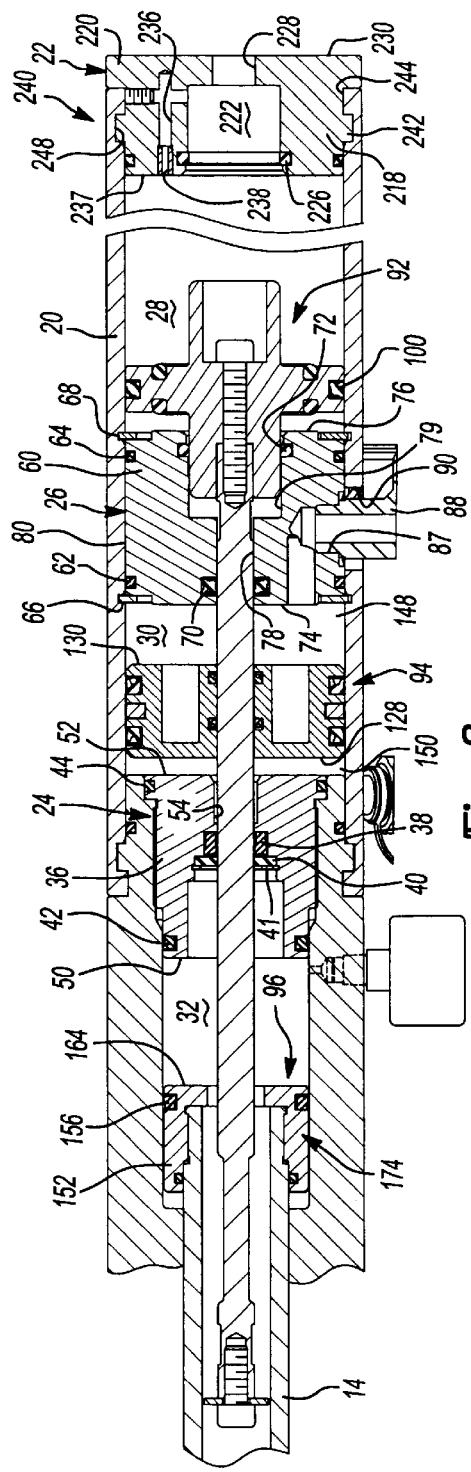
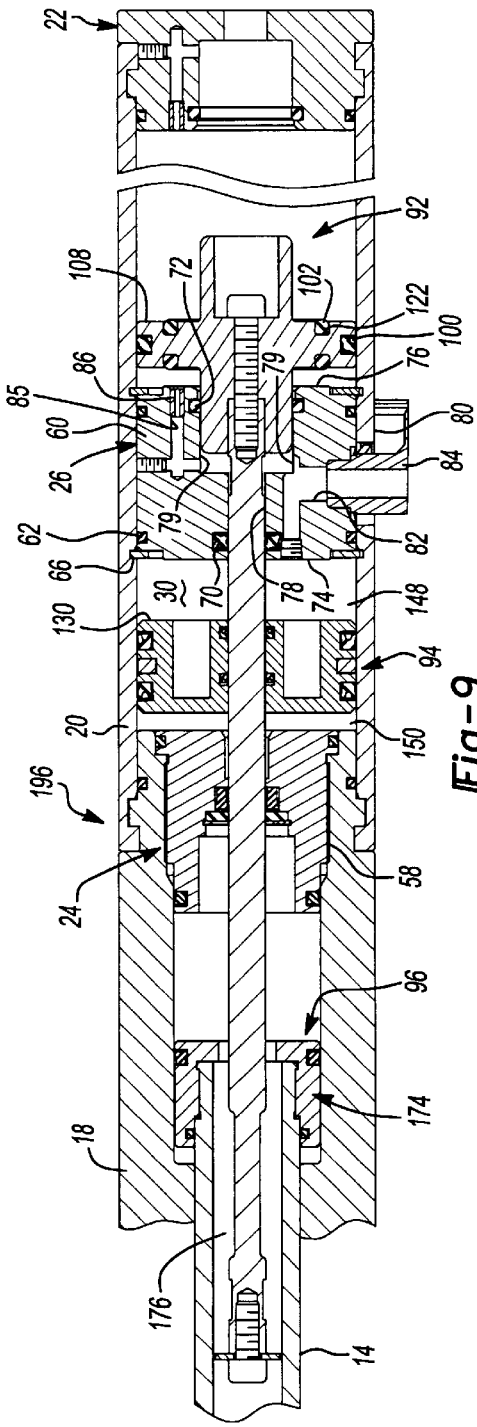

US 6,779,343 B2

AIR TO OIL INTENSIFIER

This application claims the benefit of and is a continuation-in-part of U.S. patent application Ser. No. 10/192,144, filed Jul. 10, 2002.

BACKGROUND AND SUMMARY OF THE INVENTION

The present invention relates generally to a force producing apparatus and, more particularly, to an air-to-oil pressure intensifier for providing relatively large forces to machines such as clamps, grippers, presses and punches.

Many systems utilize the basic principle of inserting a rod into an enclosed oil-filled chamber to produce force. One known system injects a large volume of hydraulic fluid behind a working piston to advance a rod into contact with a work piece. The rod is further inserted into a closed chamber to obtain a force multiplication equal to the ratio of the area of working piston to the area of the end of the rod.

Because large forces are generated by air-to-oil intensifiers, the working piston is often attached to a tool which may weigh several hundred pounds or more. Returning heavy tools to an elevated or beginning position has become a significant design challenge. Some devices accomplish the task of returning the tool by using an additional piston powered by air. The piston must be of sufficient diameter to produce the requisite force to lift the tool. Devices incorporating external additional pistons are very costly, difficult to package within work cells having limited space and require special air circuits and controls to operate the multiple piston arrangement. These systems are typically large in length and may only be shortened by stacking the units side by side.

Accordingly, it would be beneficial to provide a compact, lightweight pressure intensifier capable of lifting heavy tooling without the use of an external assist cylinder.

A device minimizing the need for external valving and circuit controllers required for operation would also be of benefit.

The present invention provides a pressure intensifier for providing relatively large output forces using an air or hydraulic force amplification system. According to one aspect of the present invention, a rod is driven into a sealed chamber of substantially incompressible fluid to generate an output force.

According to another aspect of the present invention, a compact, lightweight pressure intensifier capable of lifting heavy tooling with the use of an external assist cylinder is provided.

According to another aspect of the present invention, a first piston is selectively driven by a fluid power source to retract the piston from a previously force-intensified position.

According to yet another aspect of the present invention, two pistons are coupled to the rod to substantially reduce the input pressure required to produce a given output force.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 8 is a cross-sectional view of the pressure intensifier taken along line 8—8 of FIG. 7;

FIG. 9 is a cross-sectional view of the pressure intensifier taken along line 9—9 of FIG. 7;

DETAILED DESCRIPTION OF THE PREFERRED EMBODIMENTS

Figure 1:
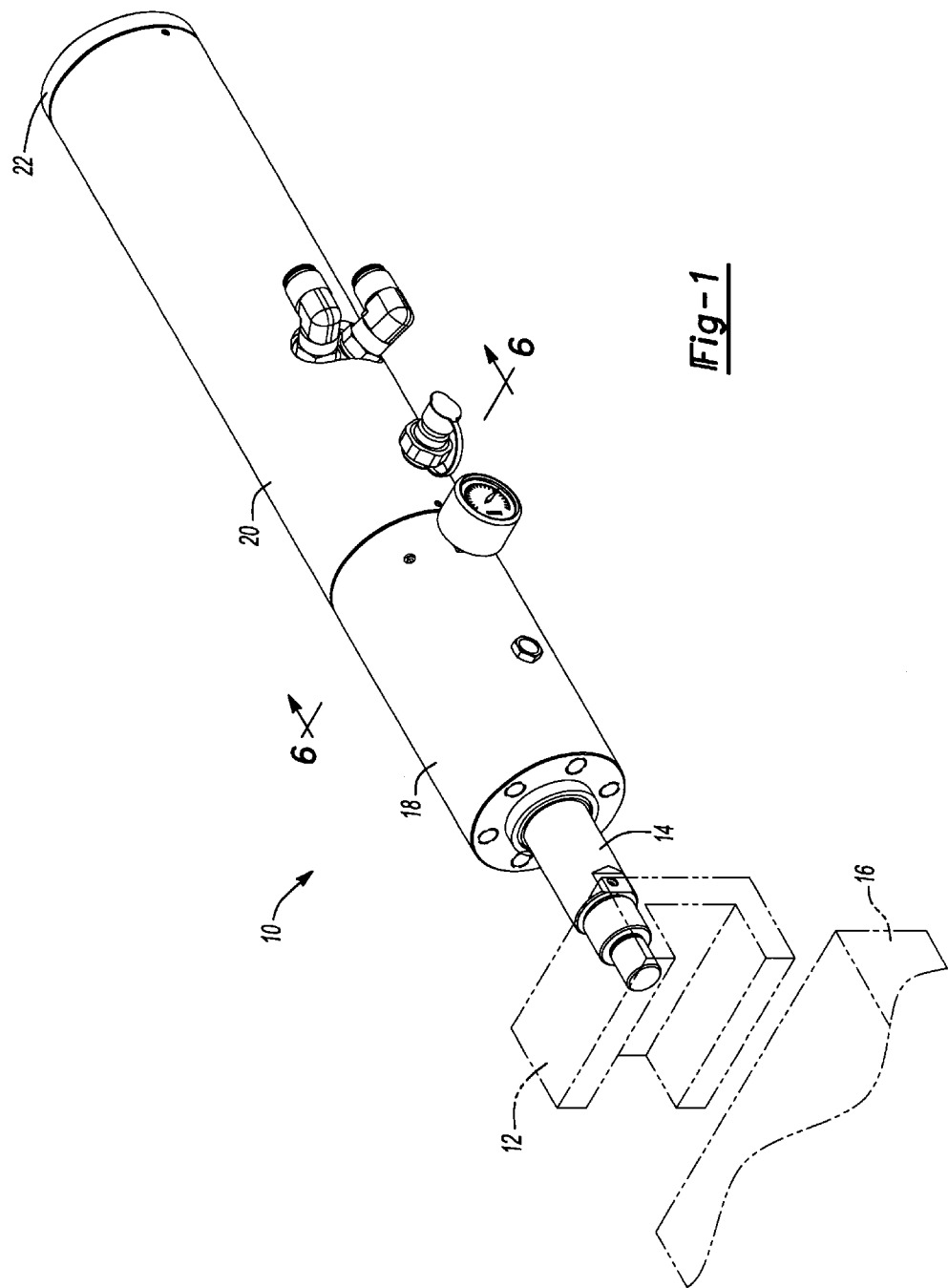
FIG. 1 is a perspective view of a pressure intensifier according to the principles of the present invention.
Figure 2:
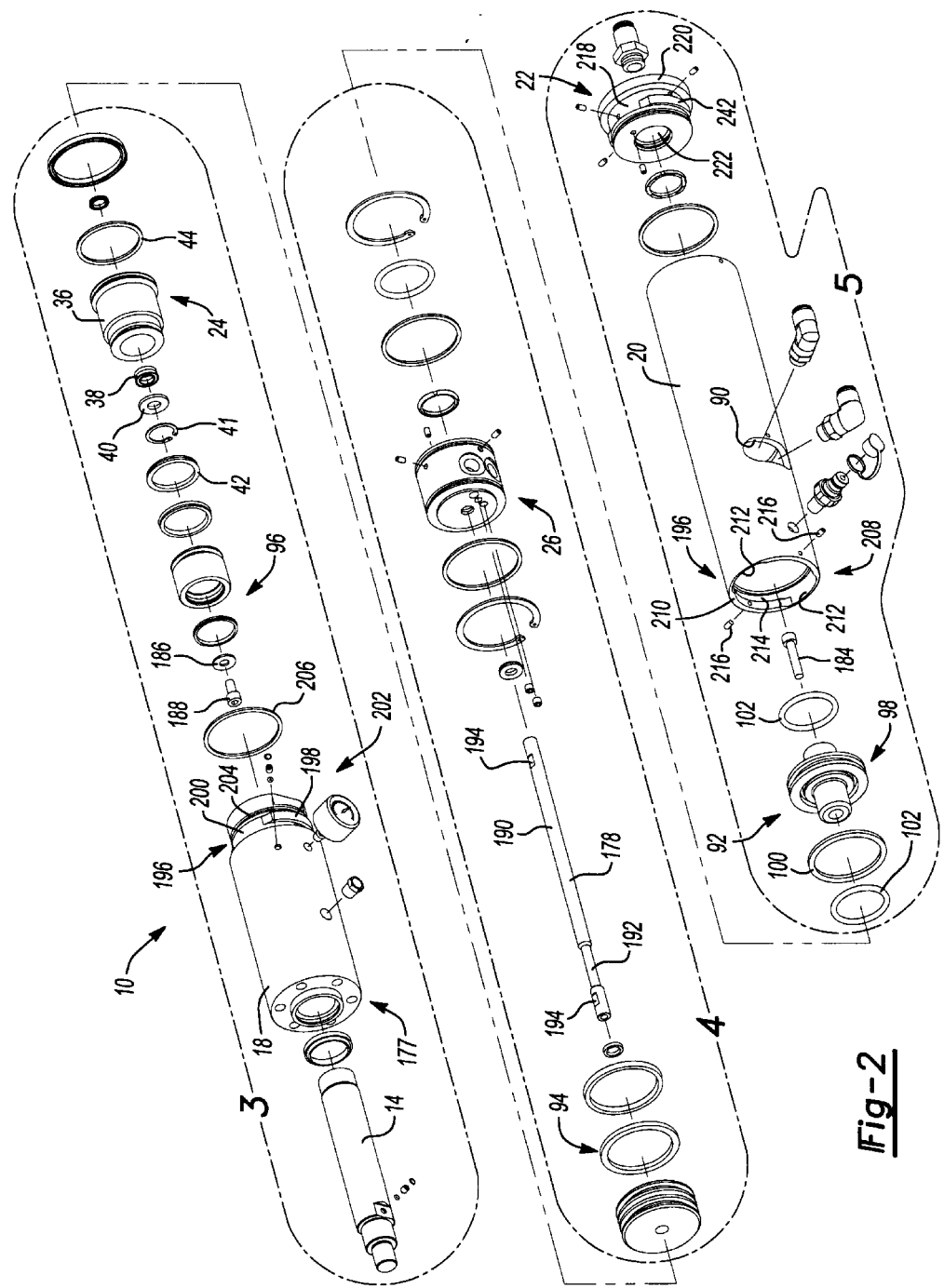
FIG. 2 is an exploded perspective view of the pressure intensifier shown in FIG. 1.

With reference to FIGS. 1 and 2, an air-to-oil pressure intensifier constructed in accordance with the teachings of the present invention is identified at reference numeral 10. Pressure intensifier 10 functions to provide a relatively large output force at a driven end using only compressed air at relatively low pressure (80 to 120 psi) as the power source. Typically, the driven end of the pressure intensifier is coupled to tooling such as a clamp half, a rivet hammer or a punch, collectively identified as a tool 12.

Pressure intensifier 10 operates by extending and retracting a ram 14 to place tool 12 into engagement with a work piece 16. As will be described in greater detail hereinafter, pressure intensifier 10 operates to rapidly translate tool 12 toward work piece 16 using relatively low force. Once tool 12 contacts work piece 16, pressure intensifier 10 generates a greatly multiplied force between tool 12 and work piece 16. On the return stroke, a piston with a relatively large working area within pressure intensifier 10 is pressurized to lift the heaving tooling in preparation for the next work cycle.

Pressure intensifier 10 includes a substantially cylindrical hollow front cylinder 18 coupled to a substantially cylindrical hollow rear cylinder 20. An end cap 22 closes one of the open ends of rear cylinder 20.

Figure 3:
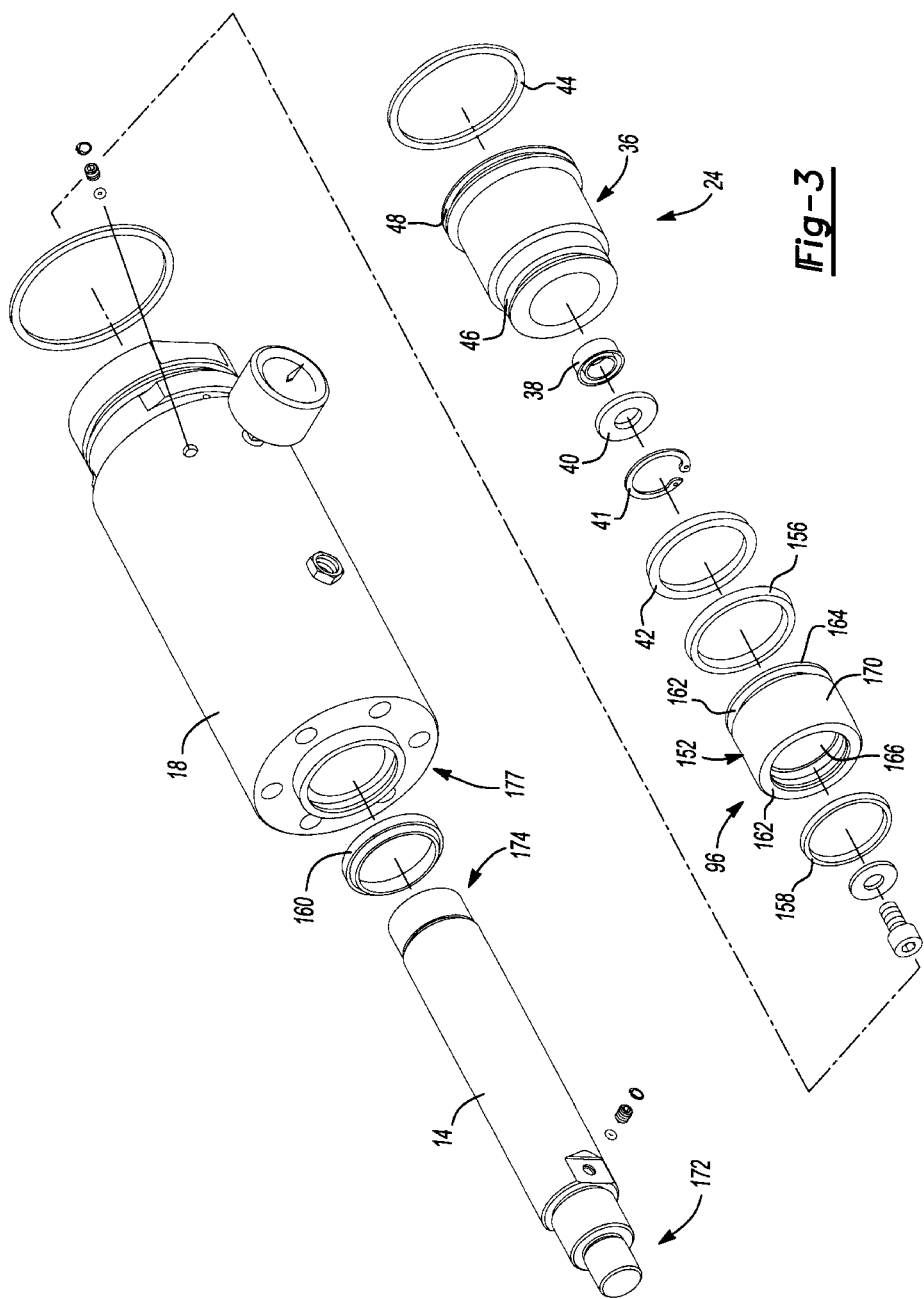
FIG. 3 is an enlarged perspective view of the encircled area of FIG. 2.

As shown in FIGS. 3, 8 and 9, a divider assembly 24 and a bulkhead assembly 26 divide the interior volume of pressure intensifier 10 into a first cavity 28, a second cavity 30 and a third cavity 32. Divider assembly 24 includes a divider 36, a high pressure seal 38, a seal retainer 40, a retaining ring 41, a front seal 42 and a rear seal 44.

Divider 36 is a generally hollow cylindrical member having a series of stepped cylindrical portions along its outside diameter as well as along its inside diameter. Specifically, divider 36 includes a first external groove 46 and a second external groove 48 for receipt of front seal 42 and rear seal 44, respectively. As best shown in FIGS. 8 and 9, divider 36 includes a front face 50, a rear face 52 and a passageway 54 extending therebetween. Passageway 54 includes a series of stepped portions 56 shaped to complement high pressure seal 38, seal retainer 40 and retaining ring 41. Accordingly, high pressure seal 38 is captured between divider 36 and retaining ring 41. Divider 36 is coupled to front cylinder 18 with an external thread 58.

Figure 4:
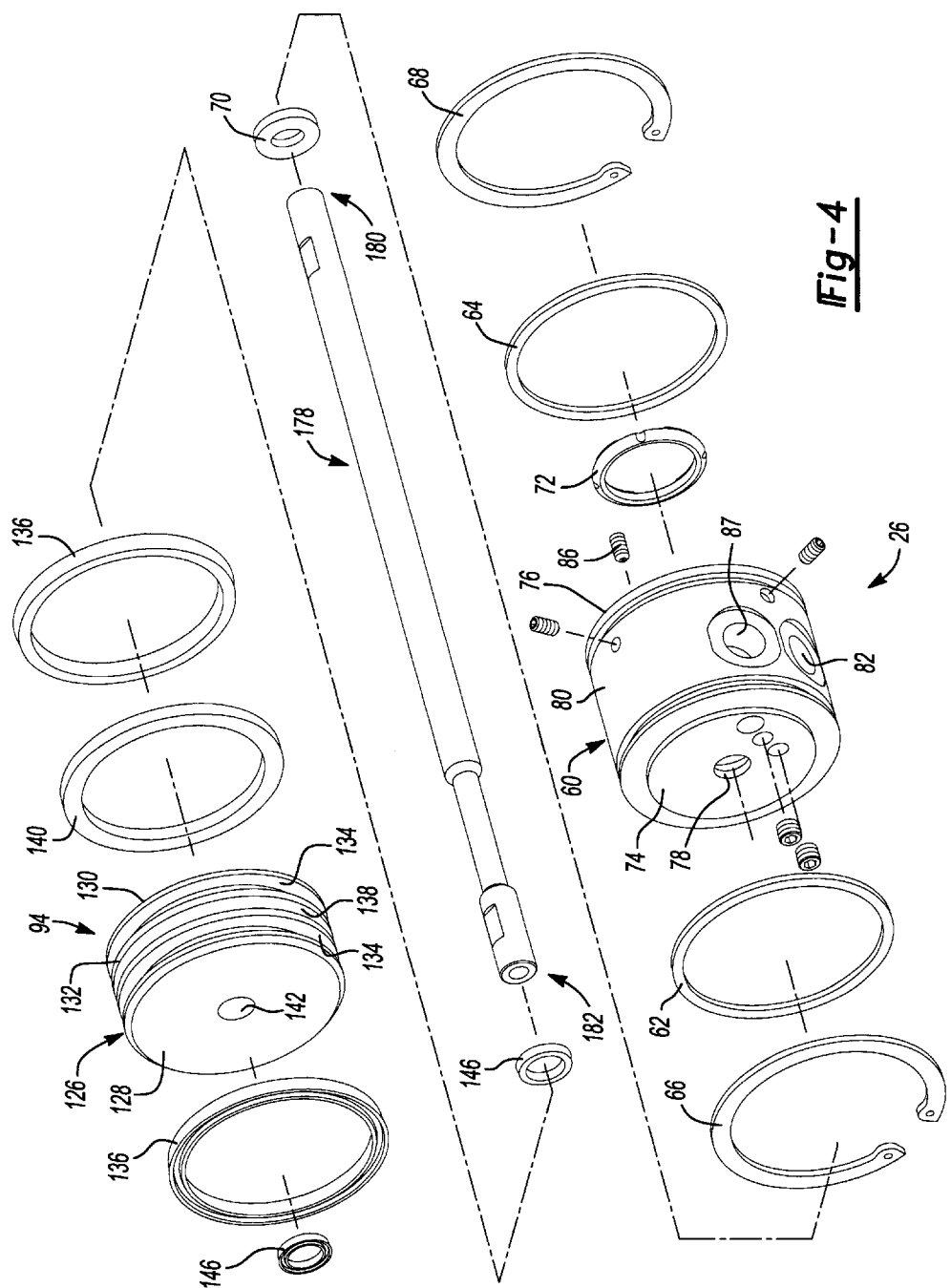
FIG. 4 is an enlarged perspective view of the encircled area of FIG. 2.

Bulkhead assembly 26 (FIG. 4) includes a bulkhead 60, a front seal 62, a rear seal 64, a front retaining ring 66, a rear retaining ring 68, a shaft seal 70 and an oil chamber cushioning seal 72. Bulkhead 60 is a substantially cylindrical member having a front face 74 and a rear face 76. Bulkhead 60 includes a passageway 78 extending from front face 74 to rear face 76. Passageway 78 of bulkhead 60 includes a counterbore 79 having oil chamber cushioning seal 72 positioned therein. Bulkhead 60 includes an outer surface 80. A first port 82 (FIG. 9) extends through bulkhead 60 from outer surface 80 to counterbore 79. A first fitting 84 is coupled to first port 82 to allow pressurized fluid to enter and exit first cavity 28. A passageway 85 interconnects counterbore 79 and first cavity 28. An orifice 86 is inserted within passageway 85 to restrict air from exiting first cavity 28 at a rapid rate, thereby acting as a damper against impact.

A second port 87 (FIG. 8) extends from outer surface 80 through bulkhead 60 and exits at front face 74. Accordingly, a second fitting 88 is coupled to second port 87 to allow pressurized fluid to enter and exit second cavity 30. Rear cylinder 20 includes an aperture 90 to allow first fitting 84 and second fitting 88 to access bulkhead 60.

Pressure intensifier 10 includes a first piston assembly 92, a second piston assembly 94 and a third piston assembly 96. First piston assembly 92 is positioned within first cavity 28. First piston assembly 92 is free to move axially within first cavity 28 from a retracted position shown in FIG. 10 to an advanced position shown in FIG. 12.

First piston assembly 92 (FIG. 5) includes a first piston 98, a seal 100 and a pair of shocks 102. First piston 98 is a generally cylindrically-shaped member including a body 104, a front face 106, a rear face 108 and an outer surface 110. A front trunion 112 extends from front face 106. A rear trunion 114 extends axially from rear face 108. Front trunion 112 includes an outer cylindrical surface 116. Rear trunion 114 includes an outer cylindrical surface 118.

Front face 106 includes an annular groove 120 sized to receive one of shocks 102. Similarly, rear face 108 includes an annular groove 122 sized to receive another shock 102. Shocks 102 dampen the impact forces generated as first piston assembly 92 approaches end cap 22 or bulkhead 60. Outer surface 110 includes an annular groove 124 for receipt of seal 100. Seal 100 is positioned between body 104 and rear cylinder 20 to capture fluid within first cavity 28 on either side of seal 100.

Second piston assembly 94 (FIG. 4) includes a generally cylindrically-shaped piston 126 having a front face 128, a rear face 130 and an outer surface 132. Outer surface 132 includes a pair of spaced apart circumferential grooves 134 sized for receipt of a pair of seals 136. Outer surface 132 includes a retention groove 138 positioned between grooves 134 for capturing a ring 140. Preferably, ring 140 is constructed from a material capable of maintaining a magnetic charge. Piston 126 includes a substantially cylindrical bore 142 extending from front face 128 to rear face 130. Bore 142 includes a pair of seal grooves 144 for receipt of a pair of shaft seals 146.

Second piston assembly 94 is free to axially move within second cavity 30 to the extent divider assembly 24 and bulkhead assembly 26 allow. It should be appreciated that a portion 148 (FIG. 8) of second cavity 30 defined between rear face 130 of second piston 126 and front face 74 of bulkhead 60 contains a compressible fluid such as air. Second port 87 provides a conduit for supplying compressed air to portion 148 of second cavity 30.

Another portion 150 of second cavity 30 is defined by front face 128 of second piston 126 and rear face 52 of divider 36. Second portion 150 of second cavity 30 contains an incompressible fluid such as oil. Oil is also contained within the captured volume of third cavity 32 and third piston assembly 96.

Third piston assembly 96 (FIG. 3) includes a third piston 152, a ram 14, a cylinder seal 156, a ram seal 158 and a ram wiper 160. Third piston 152 is a generally cylindrically-shaped member having a front face 162, a rear face 164 and a stepped bore 166 extending therethrough. Cylinder seal 156 is positioned within a groove 168 located on an outer surface 170 of third piston 152.

Ram 14 is an elongated cylindrical member having a first end 172 and a second end 174. A pressure chamber 176 is formed within ram 14 and is shaped as a blind bore entering from second end 174. Ram seal 158 is positioned between ram 14 and third piston 152 to contain pressurized fluid within pressure chamber 176. Ram wiper 160 provides a line of defense from contaminants within the work environment. Ram wiper 160 is positioned at a front end 177 of front cylinder 18 in contact with ram 14.

A rod 178 (FIGS. 2 and 4) includes a first end 180 and a second end 182. First end 180 is coupled to first piston 98 via a fastener 184. Rod 178 extends through passageway 78 of bulkhead assembly 26, bore 142 of second piston 126, passageway 54 of divider 36 and stepped bore 166 of third piston 152. A washer 186 is positioned within pressure chamber 176 and coupled to the second end 182 of rod 178 with a threaded fastener 188.

Rod 178 includes a generally cylindrical body portion 190 having a first diameter and a generally cylindrical necked portion 192 having a diameter less than the diameter of body portion 190. Flats 194 are placed along the length of rod 178 to assist with the assembly of components.

To assemble pressure intensifier 10, first piston assembly 92, second piston assembly 94, third piston assembly 96, divider assembly 24 and bulkhead assembly 26 are positioned within front cylinder 18 and rear cylinder 20 as depicted in the Figures. Front cylinder 18 is coupled to rear cylinder 20 using a retention mechanism 196 best depicted in FIGS. 2, 6 and 9. Retention mechanism 196 includes a pair of lobes 198 radially extending from a cylindrical surface 200 located at a rear end 202 of front cylinder 18. Cylindrical surface 200 includes a groove 204 for receipt of a housing seal 206.

The complimentary portion of retention mechanism 196 is located at a front end 208 of rear cylinder 20. Front end 208 includes a lip 210 interrupted by two or four recesses 212 located ninety or one hundred and eighty degrees apart from one another. Recesses 212 are shaped to compliment the profile of lobes 198. A slot 214 is positioned rearward of lip 210 and is sized to accept lobes 198 therewithin.

Figure 6:
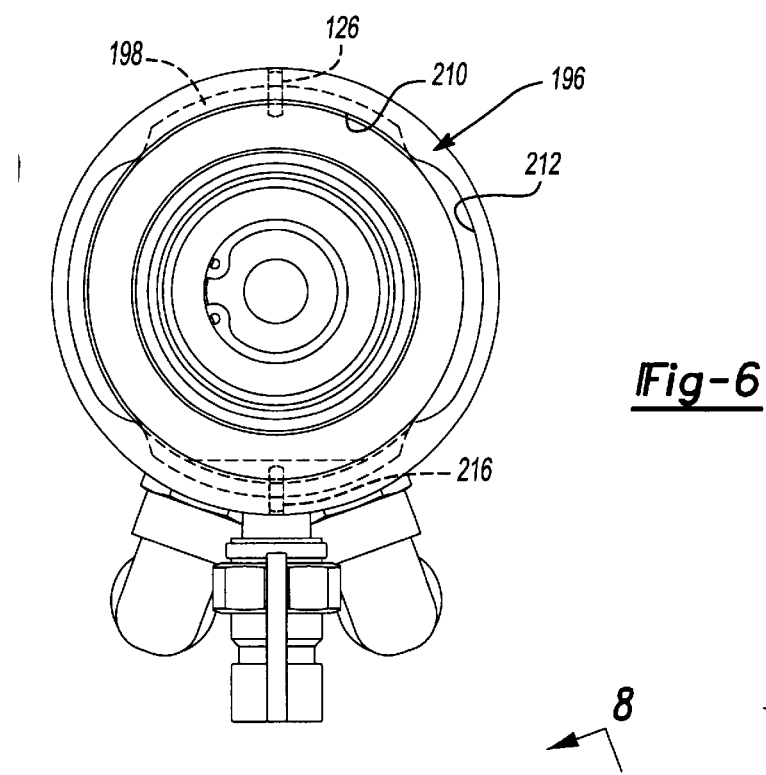
FIG. 6 is a cross-sectional view of the pressure intensifier taken along line 6—6 of FIG. 1.
Figure 7:
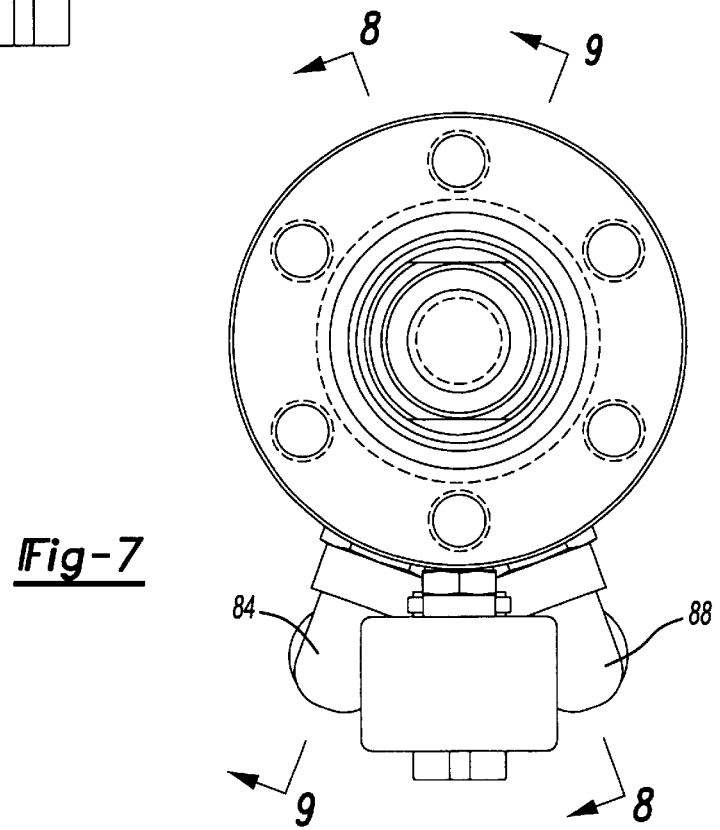
FIG. 7 is an end view of the pressure intensifier of the present invention.

To couple front cylinder 18 to rear cylinder 20, lobes 198 are aligned with recesses 212 and the cylinders are moved toward one another. At this time, lobes 198 are positioned within slot 214. Front cylinder 18 is then rotated relative to rear cylinder 20 forty-five or ninety degrees to trap lobes 198 within slot 214, as shown in FIG. 6. A pair of set screws 216 interconnect front cylinder 18 with rear cylinder 20 and prevent inadvertent rotation of the cylinders relative to one another during operation of pressure intensifier 10.

Figure 5:
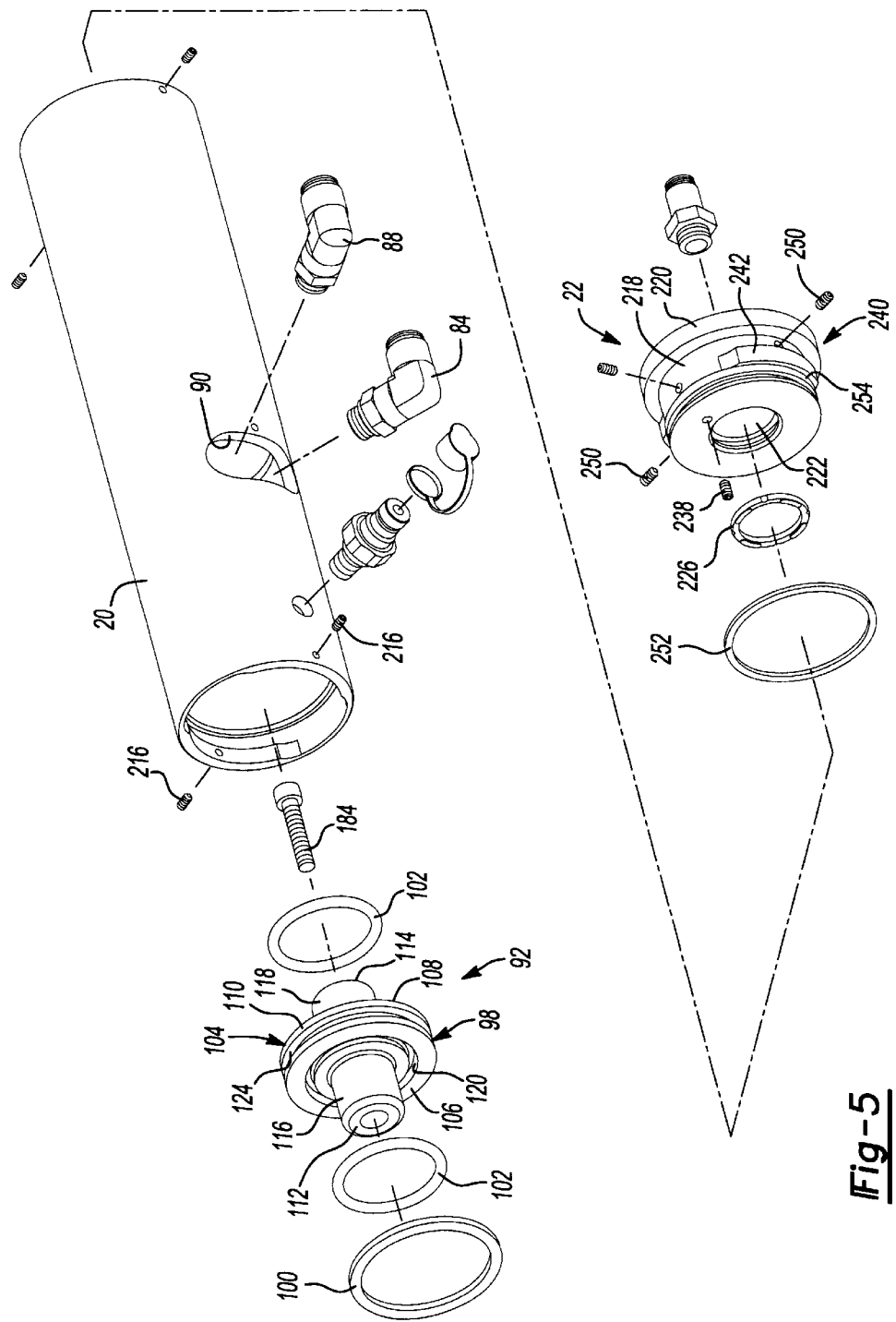
FIG. 5 is an enlarged perspective view of the encircled area of FIG. 2.

With reference to FIGS. 5 and 8, end cap 22 includes a generally cylindrical body 218, a flange 220 and a bore 222 extending into body 218. Bore 222 is sized for receipt of rear trunion 114 of first piston 98 when first piston 98 is in the fully retracted position. A cushion seal 226 is positioned within bore 222 and contacts outer cylindrical surface 118 when first piston assembly 92 is in the retracted position. An inlet port 228 inwardly extends from a rear face 230 in communication with bore 222 and first cavity 28. Inlet port 228 is also in communication with a passageway 236 extending from bore 222 to a front face 237 of end cap 22. An orifice screw 238 is positioned within passageway 236 to limit the volumetric flow rate of air attempting to escape first cavity 28 as rear trunion 114 enters bore 222 during retraction of first piston assembly 92. Therefore, impact loading of first piston 98 against end cap 22 is avoided.

End cap 22 is coupled to rear cylinder 20 using a retention mechanism 240 similar to the retention mechanism used to couple front cylinder 18 to rear cylinder 20. Specifically, end cap 22 includes a pair of lobes 242 extending radially therefrom. Lobes 242 cooperate with a lip 244 to resist axial separation forces generated by pressurized fluid within the cavities.

Recesses (not shown) extend through lip 244. A slot 248 is positioned behind lip 244 to retain lobes 242. A pair of set screws 250 interconnects end cap 22 and rear cylinder 20 to prevent rotation of lobes 242 within slot 248. An end cap seal 252 is positioned within a groove 254 of end cap 22 to prevent compressed air from escaping first cavity 28.

Figure 10:
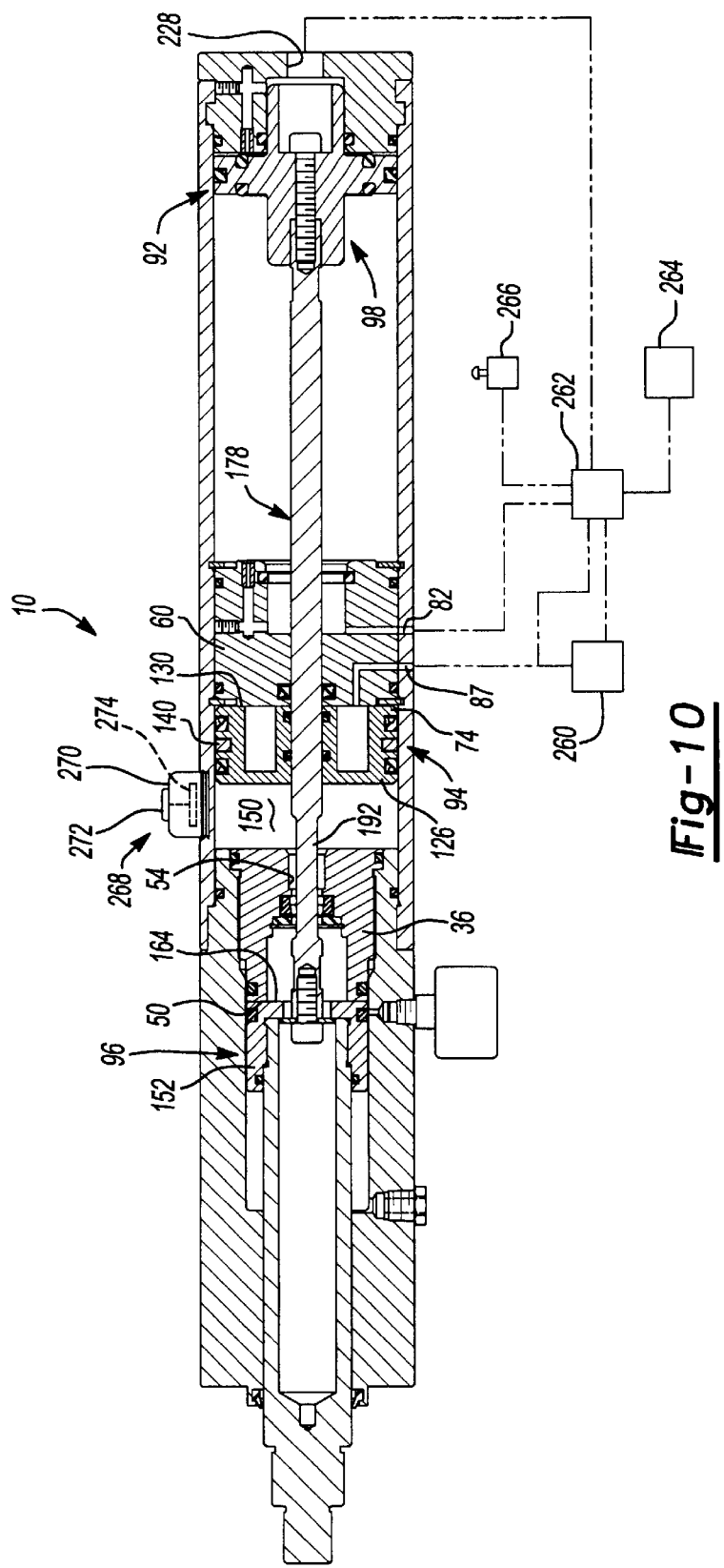
FIG. 10 is a cross-sectional view of the pressure intensifier having the first piston positioned in a fully retracted position.
Figure 11:
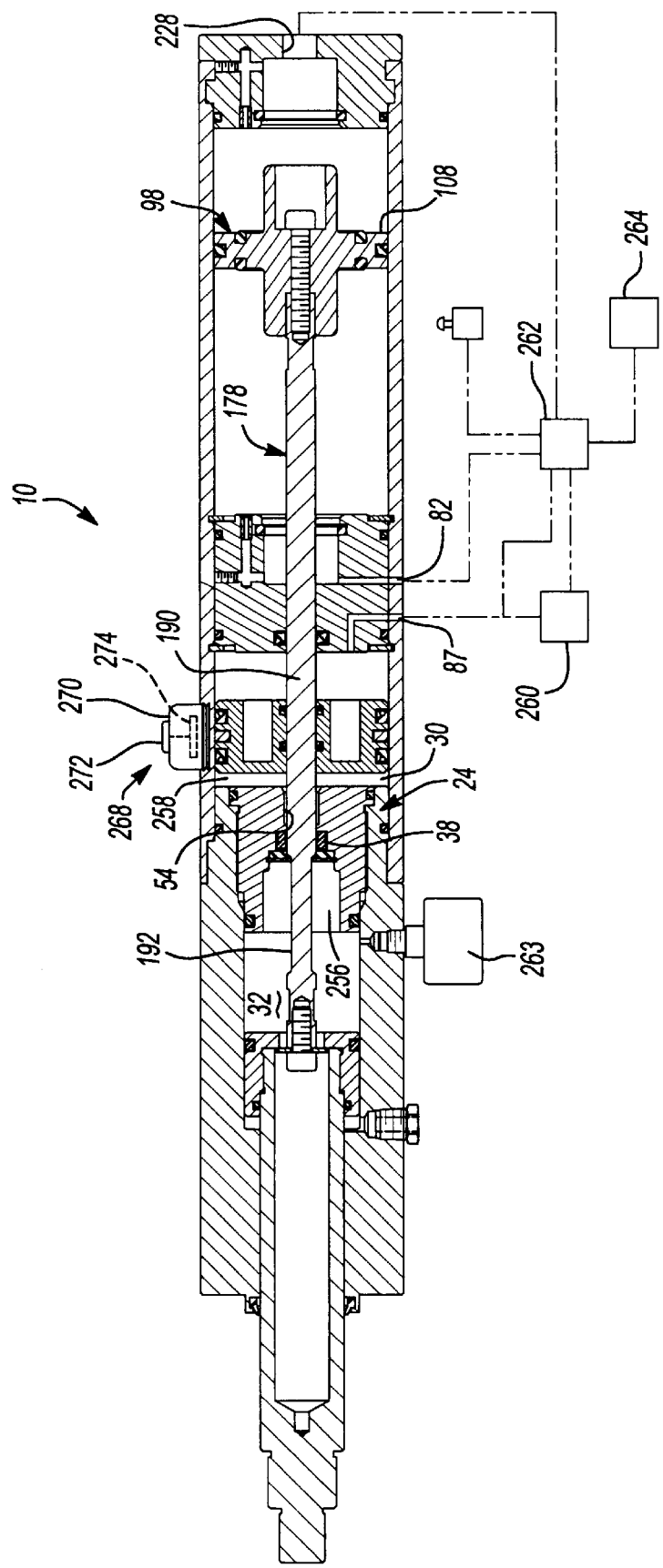
FIG. 11 is a cross-sectional view of the pressure intensifier showing the first piston positioned in an intermediate position.
Figure 12:
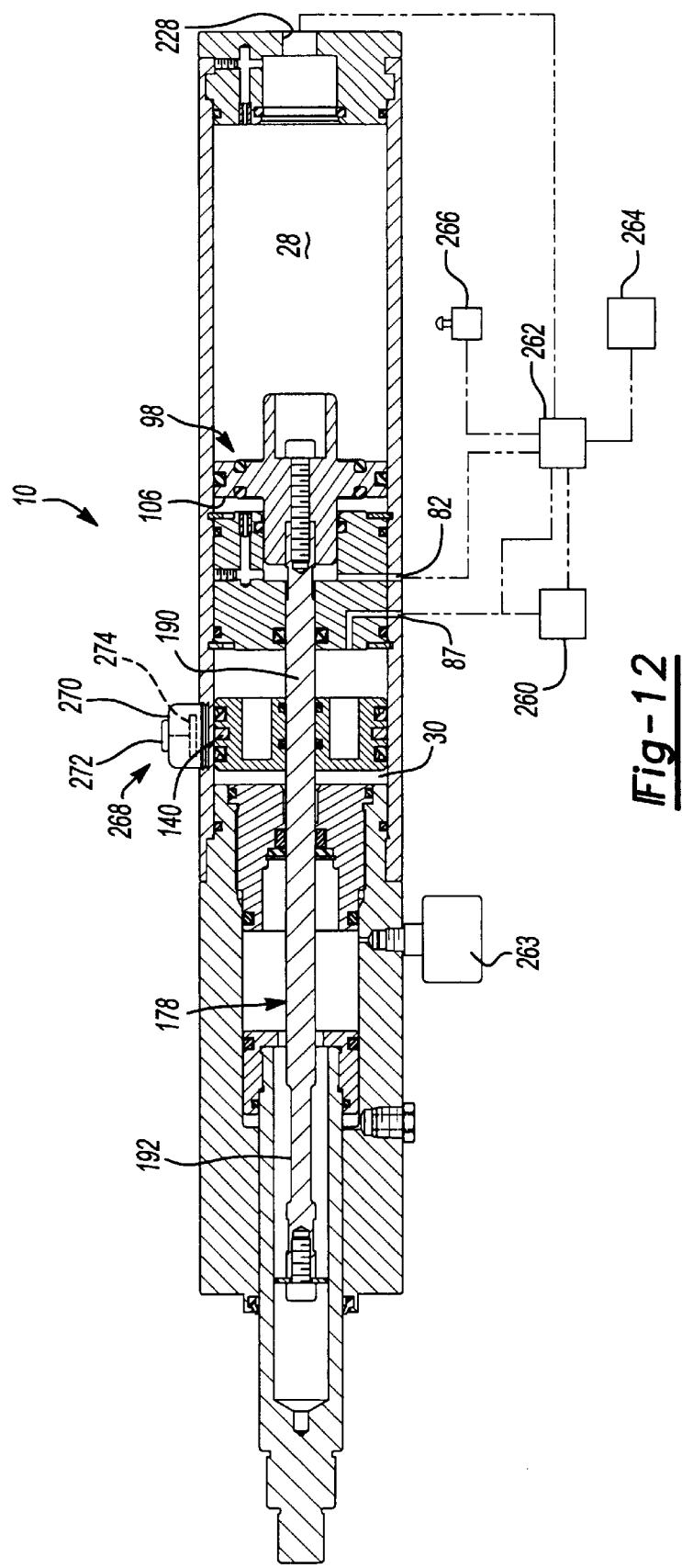
FIG. 12 is a cross-sectional view of the pressure intensifier showing the first piston in an advanced position.

With reference to FIGS. 10–12, operation of pressure intensifier 10 will now be described. FIG. 10 depicts first piston assembly 92 in the retracted position. At this time first port 82 is pressurized with compressed air at approximately 80 psi. Second port 87 and inlet port 228 are vented to atmosphere. It should be noted that second piston assembly 94 is in a retracted position having rear face 130 contacting front face 74 of bulkhead 60. Additionally, third piston assembly 96 is in a fully retracted position having rear face 164 of third piston 152 positioned adjacent front face 50 of divider 36.

To initiate movement of ram 14 in the advanced direction, first port 82 and inlet port 228 are vented to atmosphere during a first phase of actuation. Second port 87 is energized with pressurized air at approximately 80 psi. During the first phase of actuation, ram 14 is extended rapidly using relatively low force to cause tool 12 to contact work piece 16. The input pressure at second port 87 causes second piston 126 to axially move from right to left as shown in the Figures. As second piston 126 moves, the incompressible fluid located within portion 150 of second cavity 30 passes by necked portion 192 of rod 178 through passageway 54 of divider 36 causing third piston assembly 96 to move axially toward the extended position. Because rod 178 is coupled to third piston assembly 96 via threaded fastener 184, rod 178 and first piston 98 translate to the position shown in FIG. 11.

At the end of phase one, necked portion 192 of rod 178 has fully traversed the area of divider assembly 24 including high pressure seal 38. As body portion 190 of rod 178 enters high pressure seal 38, a high pressure chamber 256 and a low pressure chamber 258 are formed. Hydraulic fluid may no longer freely flow through passageway 54.

A pressure valve 260 senses pressure at second port 87. Pressure valve 260 is plumbed in communication with a switching valve 262 which controls the condition of first port 82, second port 87 and inlet port 228. Each of the ports may be placed in a pressurized condition being supplied with approximately 80 psi or a vented condition allowing pressurized fluid to escape to atmosphere.

Once pressure valve 260 senses a pressure indicating that ram 14 has extended to cause tool 12 to contact work piece 16, switching valve 262 directs pressure intensifier 10 to commence phase two of the actuation. During phase two, pressurized air is supplied to second port 87 and inlet port 228 while first port 82 is instructed to remain vented to atmosphere. Pressure acting on rear face 108 of first piston 98 causes first piston 98 to translate to the advanced position shown in FIG. 12. Because body portion 190 of rod 178 is engaged with high pressure seal 38, entry of rod 178 within high pressure chamber 256 causes a very large force amplification due to the incompressibility of the fluid located within the high pressure chamber. A pressure gauge 263 is plumbed in communication with high pressure chamber 256 to provide an operator a visual indication of the hydraulic pressure generated during operation of pressure intensifier 10.

A timer valve 264 is plumbed in communication with switching valve 262. Timer valve 264 operates to assure that the intensified pressure reaches a maximum before switching valve 262 acts to retract ram 14. Once a predetermined time has elapsed for maximum pressure to be reached within high pressure chamber 256, timer valve 264 signals switching valve 262 to retract ram 14. At this time, second port 87 and inlet port 228 are vented to atmosphere while an 80 psi compressed air source is coupled to first port 82.

Pressurized fluid entering first port 82 acts on front face 106 of first piston 98 to generate a relatively large lifting force during retraction of ram 14. A large force may be produced because the area on which the pressurized fluid acts includes the entire cross-sectional area of first cavity 28 minus the relatively small cross-sectional area of rod 178. Accordingly, heavy equipment such as tool 12 may be lifted without assistance from external booster cylinders or other load lifting devices.

During retraction of rod 178, necked portion 192 clears high pressure seal 38 allowing washer 186 and threaded fastener 188 to axially displace third piston assembly 96 in the retracted direction. Oil passes from third cavity 32 to second cavity 30 through passageway 54. The transfer of fluid causes second piston assembly 94 to move in the retracted direction as well. First piston assembly 92 and rod 178 continue to retract until rear face 108 of first piston 98 contacts end cap 22. At this time, pressure intensifier 10 is in position to begin another actuation cycle.

It should be appreciated that any number of input signals may be used to start a given pressure intensifier sequence. For example, a typical two palm valve anti-repeat circuit 266 including an emergency stop valve may be implemented. An electrical system having an output fluid start-up may also be used. Alternatively, the start signal and control system may include electrically operated solenoid valves.

Pressure intensifier 10 includes an oil level detection system 268 including a reed switch 270, a light emitting diode 272, a battery 274 and magnetic ring 140. If the incompressible liquid level within second cavity 30 becomes low, magnetic ring 140 comes within sensing proximity of reed switch 270. Reed switch 270 closes causing electrical current from battery 274 to power light emitting diode 272. Accordingly, light emitting diode 272 provides an operator with a visual indication of low liquid level prior to pressure intensifier 10 becoming ineffective.

Figure 13:
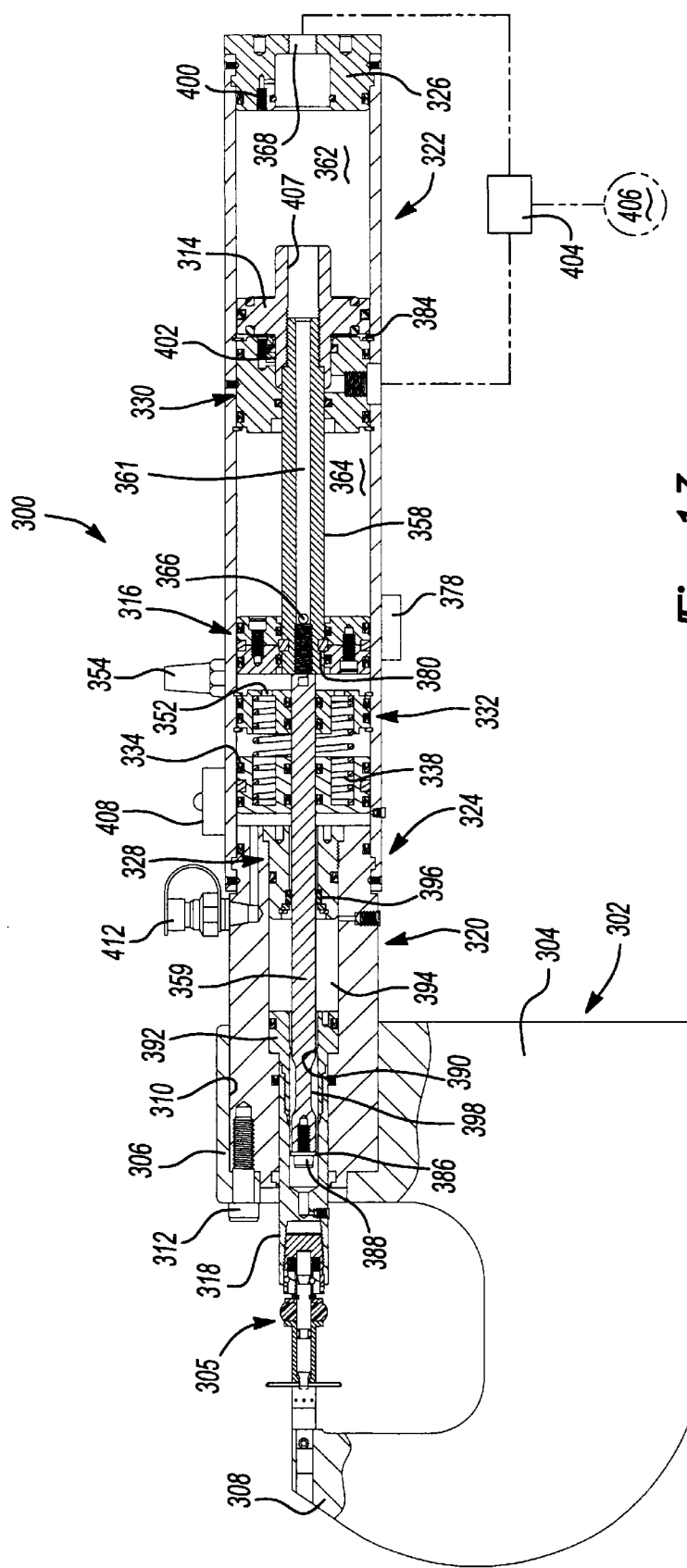
FIG. 13 is a partial cross-sectional view of an alternate embodiment air-to-oil intensifier.
Figure 14:
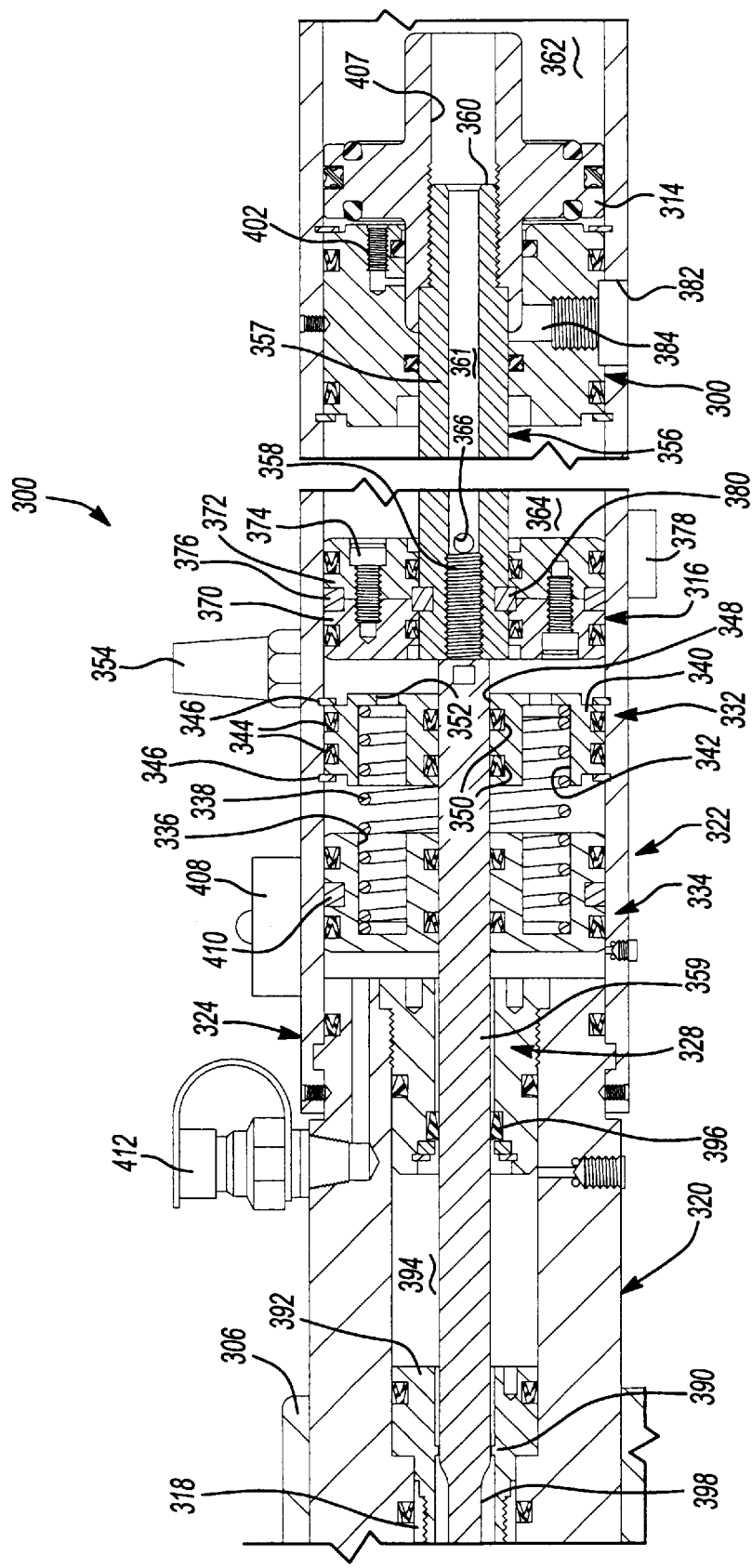
FIG. 14 is an enlarged fragmentary cross-sectional view of the alternate embodiment air-to-oil intensifier.

With reference to FIGS. 13 and 14, an alternative embodiment air-to-oil intensifier is depicted at reference numeral 300. Intensifier 300 is shown coupled to an exemplary frame and punch assembly 302. Frame and punch assembly 302 includes a generally C-shaped frame 304 and a punch assembly 305 coupled thereto. Frame 304 includes a base portion 306 and an anvil 308 located at opposite ends of C-shaped frame 304. Base portion 306 includes an aperture 310 extending therethrough. Aperture 310 is sized to receive a portion of intensifier 300. A fastener 312 couples intensifier 300 to frame and punch assembly 302.

It should be appreciated that air-to-oil intensifier 300 includes many components similar to those identified in the description of the previous air-to-oil intensifier embodiment. For clarity, similar component titles will be used where possible. However, intensifier 300 includes a number of new components providing enhanced functionality as will be described hereinafter.

Intensifier 300 includes a first piston 314 and an intermediate piston assembly 316, both of which are acted upon by a pressurized fluid during an advancing stroke. Use of intermediate piston assembly 316 doubles the effective surface area being pressurized. As such, intensifier 300 produces output forces equal to competitive products using one-half the air pressure. One embodiment of intensifier 300 includes a three and one-half inch diameter bore in which first piston 314 and intermediate piston assembly 316 are be axially positioned. When a compressed air source of approximately 90 psi is coupled to intensifier 300, over 6.5 metric tons of force are output at ram 318. Therefore, workplace safety may be enhanced by alleviating the requirement for a high pressure energy source operating at 140 psi or more. Additionally, the size of intensifier 300 remains relatively compact and easily packagable in a variety of workplace environments.

As shown in FIGS. 13 and 14, intensifier 300 includes a front cylinder 320 coupled to a rear cylinder 322. Front and rear cylinders are coupled to one another using a bayonet type retention mechanism 324 as previously described. An end cap 326 encloses the open end of rear cylinder 322. End cap 326 is coupled to rear cylinder 322 with a similar bayonet retention mechanism.

Intensifier 300 includes a divider assembly 328 and a bulkhead assembly 330 coupled to front cylinder 320 and rear cylinder 322, respectively. An intermediate bulkhead assembly 332 is coupled to rear cylinder 322 between divider assembly 328 and bulkhead assembly 330. A second piston 334 is slidably positioned between intermediate bulkhead assembly 332 and divider assembly 328. Second piston 334 includes an annular recess 336 for receipt of a spring 338.

Intermediate bulkhead assembly 332 includes an intermediate bulkhead 340 having an annular recess 342 for receipt of the opposite end of spring 338. Intermediate bulkhead assembly 332 also includes a pair of seals 344 and snap rings 346 to sealingly couple intermediate bulkhead 340 to rear cylinder 322. Intermediate bulkhead 340 includes a central bore 348 having a pair of shaft seals 350 positioned therein. An aperture 352 extends through intermediate bulkhead 340 to allow air to freely pass to and from the enclosed area occupied by spring 338. An exhaust port 354 is positioned in communication with aperture 352 to assure uninhibited movement of second piston 334 and intermediate piston assembly 316.

An intensifier rod assembly 356 includes a hollow rod 357 threadingly engaged with a first end 358 of a solid rod 359. A second end 360 of hollow rod 357 is coupled to first piston 314 via another threaded engagement. Hollow rod 357 provides a passageway 361 for pressurized air within a first cavity 362 to enter a second cavity 364 through cross-drilled aperture 366. Accordingly, pressurized air entering through a first port 368 pressurizes cavities 362 and 364 substantially simultaneously.

Intermediate piston assembly 316 includes a first half 370 coupled to a second half 372 via fasteners 374. A magnetic ring 376 is positioned between first half 370 and second half 372. A sensor 378 is positioned proximate magnetic ring 376 such that the position of intermediate piston assembly 316 may be determined during operation. A retaining ring 380 is also positioned between the first half 370 and the second half 372. Retaining ring 380 functions to couple hollow rod 357 to intermediate piston assembly 316.

During operation of intensifier 300, ram 318 is retracted by exhausting first port 368 and pressurizing a second port 382. Second port 382 provides a passageway for compressed air to enter and exit a third cavity 384 positioned in communication with first piston 314. Pressure within third cavity 384 causes first piston 314 to translate in a retracted direction toward end cap 326. Because intensifier rod assembly 356 is coupled to first piston 314, a washer 386 coupled to solid rod 359 via a fastener 388 retracts until it engages a seat 390 of a third piston 392. Third piston 392 is coupled to ram 318. Accordingly, once washer 386 engages seat 390, third piston 392 and ram 318 are axially displaced in a retracted direction.

As third piston 392 is retracted, hydraulic fluid located within a fourth cavity 394 is forced to pass by a high pressure seal 396 positioned in divider assembly 328. The hydraulic fluid is free to pass by high pressure seal 396 because necked portion 398 of intensifier rod assembly 356 is positioned proximate high pressure seal 396 at that time. As first piston 314 and third piston 392 continue to move in a retracting direction, hydraulic fluid presses upon second piston 334. The hydraulic fluid pressure is sufficient to overcome the biasing force of spring 338 thereby moving second piston 334 in a retracting direction. Air positioned within the cavity occupied by spring 338 is allowed to pass through aperture 352 of intermediate bulkhead assembly 332 and escape to atmosphere via exhaust port 354.

Intensifier 300 also includes an orifice 400 positioned within end cap 326 which serves as a retarder or impact avoiding device for the mass moving in the retracting direction. A second orifice 402 is positioned within bulkhead assembly 330 and serves an anti-impact or anti-cavitation function during movement near the end of the stroke in the advancing direction.

It should be appreciated that intensifier 300 may be operated with a single four-way valve 404 (FIG. 13) coupled to a pneumatic pressure source 406. Based on the porting pathways previously described, operation is simplified such that retraction occurs by supplying pressure to second port 382 while exhausting first port 368. Advancement occurs by shuttling the valve such that second port 382 is exhausted and pressurized air enters first port 368.

During the advancing sequence, pressurized air enters first cavity 362 to act upon first piston 314. Pressurized air passes through a bore 407 extending through first piston 314 and passageway 361 of hollow rod 357. Passageway 361 is in fluid communication with aperture 366 thereby allowing the pressurized fluid to enter second cavity 364 and act upon intermediate piston assembly 316. As first piston 314 and intermediate piston assembly 316 move in an advancing direction, intensifier rod assembly 356 and washer 386 also advance. Force from spring 338 exerted on second piston 334 displaces hydraulic fluid past high pressure seal 396 forcing seat 390 of third piston 392 to remain in contact with washer 386. This portion of the process relates to a generally rapid advance of ram 318 until contact with a work piece is made. Second piston 334 and spring 338 assure that fourth cavity 394 remains filled with hydraulic fluid during advancement of ram 318.

As discussed earlier with reference to the first embodiment air-to-oil intensifier, necked portion 398 passes by high pressure seal 396 to trap hydraulic fluid within fourth cavity 394. Accordingly, further movement of intensifier rod assembly 356 in the advancing direction generates a multiplied force output at ram 318 based on the ratio of the effective diameters of first piston 314, intermediate piston assembly 316 and the end of intensifier rod assembly 356.

Intensifier 300 is also equipped with an oil level sensor 408 positioned within sensing proximity of a magnetic ring 410. A hydraulic filler fitting 412 is positioned in fluid communication with second piston 334. Pressurized hydraulic fluid is pumped at a pressure sufficient to at least partially compress spring 338.

It should be appreciated that intensifier 300 provides a variety of advantages to the manufacturing workplace. Specifically, intensifier 300 provides a relatively small, compact device useful for producing a high output force from a standard compressed air supply pressurized at approximately 90 psi. Intensifier 300 also allows an end user to couple relatively heavy tools to the ram and retract them from a work piece surface without the use of external lift cylinders or other mechanical devices.

Further, intensifier 300 may be modified to provide any number of overall stroke lengths by simply replacing front cylinder 320 and intensifier rod assembly 356.

Figure 15:
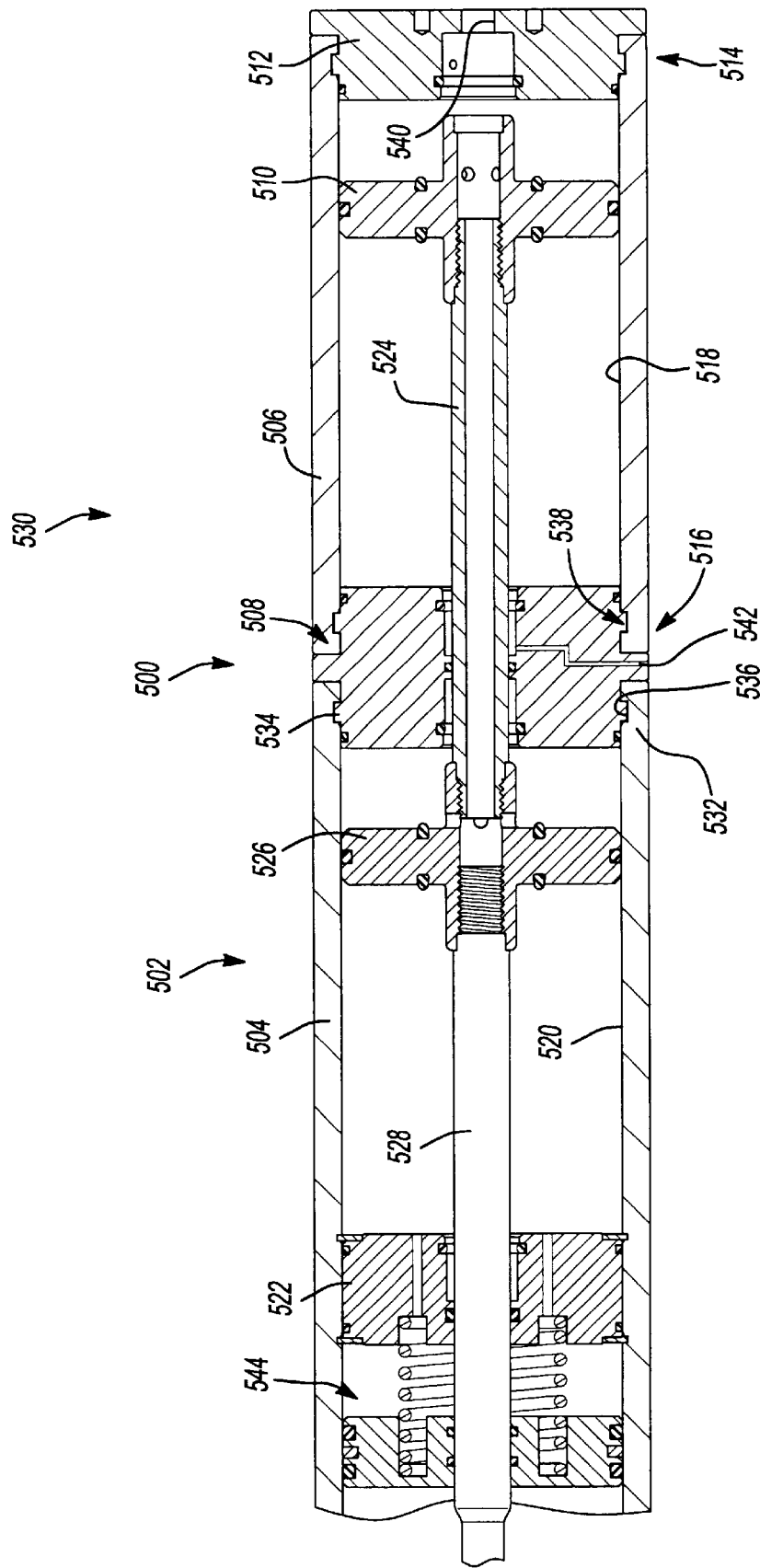
FIG. 15 is an enlarged fragmentary cross-sectional view of another alternate embodiment air-to-oil intensifier.

FIG. 15 depicts another alternate embodiment air-to-oil intensifier depicted at reference numeral 500. Intensifier 500 functions substantially similarly to intensifier 300 when assembled as depicted in FIG. 15. Intensifier 500 includes a modular design to allow a user to configure intensifier 500 as a dual piston unit as depicted in FIG. 15 or a single piston unit similar to the embodiment identified as pressure intensifier 10.

Specifically, intensifier 500 includes a segmented rear housing assembly 502 having a first segment 504 and a second segment 506 interconnected by a bulkhead assembly 508. A first piston 510 is slidably positioned within second segment 506. An end cap 512 is coupled to a first end 514 of second segment 506. A second end 516 of second segment 506 is coupled to bulkhead assembly 508. A first cavity 518 is defined by end cap 512 and bulkhead assembly 508.

As described earlier in relation to the two previous embodiments, a divider 522 is coupled to first segment 504. A second cavity 520 is defined by bulkhead assembly 508 and divider assembly 522. A hollow rod 524 interconnects first piston 510 with a second piston 526 positioned within second cavity 520. An intensify rod 528 is coupled to second piston 526 and extends axially into a selectively sealable chamber (not shown) as previously discussed.

Second segment 506, first piston 510, bulkhead assembly 508 and hollow rod 524 are identified as a module 530. Module 530 may be used to modify a single piston air-to-oil intensifier similar to the one depicted at reference numeral 10 to effectively double the output force generated per given input pressure. This is accomplished by doubling the effective piston area upon which pressurized air acts.

To convert a single piston air-to-oil intensifier into a dual piston air-to-oil intensifier, end cap 512 is removed and module 530 is inserted between first segment 504 and end cap 512. Specifically, bulkhead assembly 508 includes a forward retention mechanism 532 having a plurality of lobes 534 radially extending therefrom. Lobes 534 engage a groove 536 located in first segment 504. Second segment 506 is coupled to bulkhead assembly 508 using a second retention mechanism 538 substantially similar to retention mechanism 532. Hollow rod 524 interconnects first piston 510 and second piston 526.

In the embodiment shown, pressurized air entering through a first port 540 acts upon first piston 510 and travels through hollow rod 524 to act upon second piston 526 to move intensify rod 528 in an advancing direction. A second port 542 is plumbed through bulkhead assembly 508 to pressurize first piston 510 and move intensify rod 528 in a retracting direction opposite the advancing direction. One skilled in the art will appreciate that intensifier 500 may be configured much more similarly to intensifier 10 such that a spring and piston configuration 544 shown in FIG. 15 is replaced by a separately pressurizable piston. Furthermore, pressurized air may be routed to act upon second piston 526 to move intensify rod 528 in a retracting direction instead of routed to act on first piston 510 as shown in FIG. 15. These and other variations or combinations of embodiments are within the scope of the present invention.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A pressure intensifier for supplying force, the pressure intensifier comprising:

a housing;

first, second and third pistons slidably positioned in said housing, said first and second pistons being drivingly coupled to a rod;

wherein said third piston includes a first portion extending through said housing and a second portion in contact with a substantially incompressible fluid, wherein said substantially incompressible fluid is selectively confined within a cavity, wherein said rod includes a first end selectively moveable within said cavity and wherein said first and second pistons are drivable in a first direction by pressurized fluid to further insert said rod within said cavity and produce an amplified output force at said first portion of said third piston, wherein said first piston is drivable in a second direction opposite said first direction by pressurized fluid to retract said third piston.

2. The pressure intensifier of claim 1, including a fourth piston slidably positioned in said housing, said fourth piston in communication with said substantially incompressible fluid and biasedly coupled to said housing, wherein said fourth piston urges said substantially incompressible fluid toward said cavity.

3. The pressure intensifier of claim 2, wherein said rod includes a first portion and a second reduced portion, wherein said first portion is selectively engageable with a seal to capture said substantially incompressible fluid in said cavity, and wherein said second reduced portion of said rod is selectively positionable proximate said seal to allow said substantially incompressible fluid to exit and enter said cavity.

4. The pressure intensifier of claim 1, wherein said rod includes a passageway interconnecting a first chamber defined by a first side of said first piston with a second chamber defined by a first side of said second piston.

5. The pressure intensifier of claim 1, wherein said housing includes a front cylinder coupled to a rear cylinder, wherein said front cylinder includes a sidewall having a thickness at least twice a thickness of a sidewall of said rear cylinder.

6. A pressure intensifier for supplying force, the pressure intensifier comprising:

a housing;

first, second and third pistons slidably positioned in said housing, said first and second pistons being drivingly coupled to a rod;

wherein said third piston includes a first portion extending through said housing and a second portion in contact with a substantially incompressible fluid, wherein said substantially incompressible fluid is selectively confined within a cavity, wherein said rod includes a first end selectively moveable within said cavity and wherein said first and second pistons are drivable in a first direction by pressurized fluid to further insert said rod within said cavity and produce an amplified output force at said first portion of said third piston, wherein said third piston includes a seat engagable by said rod.

7. A method for producing an amplified force comprising:
supplying pressurized air via a single port to first and second spaced apart pistons slidably positioned in a housing;
driving a portion of a rod coupled to said first and second pistons into a selectively sealed chamber containing a substantially incompressible fluid;
sealing said chamber;
forcing said rod into said sealed chamber to drive a ram at an amplified force; and
retracting said ram by supplying pressurized air to said first piston.

8. The method of claim 7 further including initially advancing said ram prior to supplying pressurized air by placing a third piston in biased engagement with said substantially incompressible fluid.

9. The method of claim 7 further including controlling the movement of said ram in an advancing direction and said retracting direction via a single four-way valve.

10. The method of claim 7 further including coupling a magnet to said first piston and sensing the position of said first piston with a sensor coupled to said housing.

11. The method of claim 7 wherein the sealing of said chamber occurs when a portion of said rod engages a seal coupled to said housing.

12. A pressure intensifier for supplying force comprising:
a housing selectively separable into a first segment and a second segment;
a bulkhead interconnecting said first and second segments, wherein said bulkhead defines first and second cavities within said housing;
a first piston slidably positioned within said first cavity; and
a second piston slidably positioned with said second cavity; wherein said first and second pistons are coupled to a rod and wherein said rod is selectively drivable in a first direction into a third cavity containing a substantially incompressible fluid to supply an output force.

13. The pressure intensifier of claim 12 wherein one of said first and second pistons are selectively drivable in a second direction opposite said first direction.

14. The pressure intensifier of claim 13 wherein said third cavity is selectively sealable by said rod.

15. The pressure intensifier of claim 12 wherein said bulkhead includes a radially extending lobe for engagement with a slot positioned at an end of said first segment.

16. The pressure intensifier of claim 15 wherein said bulkhead includes a second radially extending lobe for engagement with a slot positioned at an end of said second segment.

17. The pressure intensifier of claim 12 wherein said bulkhead includes a radially extending flange positioned intermediate and engaging an end of said first segment and an end of said second segment.

18. The pressure intensifier of claim 12 wherein said second segment, said second piston and said bulkhead are selectively removable to form a second pressure intensifier.

19. A pressure intensifier for supplying force comprising:
a first housing having a first end and a second end;
a first piston slidably positioned in said first housing;
a first rod coupled to said first piston;
an end cap coupled to said first end of said housing; and
a module including a second housing, a second piston, a second rod and a bulkhead wherein said module is selectively insertable between said end cap and said first housing to increase the piston area available for supplying force, wherein said second rod is couplable to said first piston and said second piston, and wherein said bulkhead is adapted to couple said first housing to said second housing.

20. The pressure intensifier of claim 19 wherein said bulkhead includes a radially extending lobe for engagement with a slot positioned at an end of said first housing.

21. The pressure intensifier of claim 20 wherein said bulkhead includes a second radially extending lobe for engagement with a slot positioned at an end of said second housing.

22. The pressure intensifier of claim 19 wherein one of said first and second pistons are selectively drivable in a second direction opposite said first direction.

* * * * *

UNITED STATES PATENT AND TRADEMARK OFFICE
CERTIFICATE OF CORRECTION

PATENT NO. : 6,779,343 B2  Page 1 of 1
DATED : August 24, 2004
INVENTOR(S) : Edwin G. Sawdon It is certified that error appears in the above-identified patent and that said Letters Patent is hereby corrected as shown below:

Column 4,
Line 51, "complimentary" should be -- complementary --.
Line 54, "compliment" should be -- complement --.

Column 7,
Line 15, after "are" insert -- to --.

Column 10,
Line 10, "department" should be -- departing --.

Column 11,
Line 38, "with" should be -- within --.

Signed and Sealed this

First Day of February, 2005

JON W. DUDAS
*Director of the United States Patent and Trademark Office*